(12) United States Patent
Serhatkulu

(10) Patent No.: US 8,329,829 B2
(45) Date of Patent: Dec. 11, 2012

(54) THERMOPLASTIC POLYURETHANE COMPOSITION

(75) Inventor: Gulay Serhatkulu, Grosse Ile, MI (US)

(73) Assignee: BASF SE, Ludwigshafen (DE)

( * ) Notice: Subject to any disclaimer, the term of this patent is extended or adjusted under 35 U.S.C. 154(b) by 11 days.

(21) Appl. No.: 12/937,327

(22) PCT Filed: Apr. 9, 2009

(86) PCT No.: PCT/EP2009/054292
§ 371 (c)(1),
(2), (4) Date: Oct. 11, 2010

(87) PCT Pub. No.: WO2009/132947
PCT Pub. Date: Nov. 5, 2009

(65) Prior Publication Data
US 2011/0046306 A1 Feb. 24, 2011

Related U.S. Application Data

(60) Provisional application No. 61/048,424, filed on Apr. 28, 2008.

(51) Int. Cl.
*C08L 75/04* (2006.01)
(52) U.S. Cl. ........ 525/455; 524/268; 524/589; 524/590; 525/105; 525/106; 525/123; 525/185; 525/398; 525/399; 525/401; 525/456; 525/479

(58) Field of Classification Search ........................ None
See application file for complete search history.

(56) References Cited

U.S. PATENT DOCUMENTS 4,179,479 A 12/1979 Carter
2004/0118509 A1* 6/2004 Flexman et al. .............. 156/242

FOREIGN PATENT DOCUMENTS
EP 0 247 870 12/1987

OTHER PUBLICATIONS

Abstract for JP 61-171756 (Aug. 1986).*
International Search Report issued Sep. 14, 2009 in PCT/EP09/054292 filed Apr. 9, 2009.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

A thermoplastic polyurethane composition includes thermoplastic polyurethane (TPU), a polysiloxane, an acetal polymer, and an acrylonitrile-butadiene-styrene (ABS) copolymer. A method of forming the TPU composition includes the step of combining the TPU, the polysiloxane, the acetal polymer, and the ABS copolymer. The thermoplastic polyurethane composition is also used to form an article. The TPU composition has an increased abrasion resistance and decreased coefficient of friction as compared to existing TPUs.

18 Claims, No Drawings

THERMOPLASTIC POLYURETHANE COMPOSITION

FIELD OF THE INVENTION

The instant invention generally relates to a thermoplastic polyurethane composition, a method of making the thermoplastic polyurethane composition, and an article including the thermoplastic polyurethane composition. More specifically, the instant invention relates to a thermoplastic polyurethane composition including thermoplastic polyurethane and a combination of other components that are used to improve certain properties of the thermoplastic polyurethane composition.

DESCRIPTION OF THE RELATED ART

Thermoplastic polyurethanes (TPUs) are typically multi-block copolymers with hard and soft segments that can be produced by a poly-addition reaction of an isocyanate with a linear polymer glycol and a low molecular weight diol as a chain extender. Usually, the soft segments form an elastomer matrix which gives the TPUs elastic properties. The hard segments typically act as multifunctional tie points that function both as physical crosslinks and reinforcing fillers. TPUs can be used in a variety of products and are known in the art for toughness, low temperature flexibility, strength, abrasion resistance, transparency and chemical resistance. These physical properties can be tailored to different end uses by adjusting a nature and an amount of the isocyanate, the linear polymer glycol, and/or the low molecular weight diol.

Although TPUs typically have several desirable physical properties, many also have physical properties that render them unsuitable for use in certain applications. Many TPUs, for example, have tacky surface textures, i.e., the surfaces of the TPUs have high coefficients of friction of greater than 2. This makes these TPUs difficult to handle, and many TPUs cannot be used in cable and hose jacketing applications where surface tackiness can be problematic. The high coefficients of friction may also render the TPUs totally unusable in some applications.

TPUs also have varying levels of abrasion resistance, i.e., an ability to withstand mechanical action such as rubbing, scraping, or erosion. There are applications where this abrasion resistance needs to be improved to expand the usefulness of the TPUs in demanding environments.

Accordingly, there remains an opportunity to develop an improved TPU composition having an increased abrasion resistance and a decreased coefficient of friction that makes the TPU composition useful in a variety of applications. There also remains an opportunity to develop an improved method of forming the TPU composition.

SUMMARY OF THE INVENTION AND ADVANTAGES

The present invention provides a thermoplastic polyurethane composition and a method of forming the thermoplastic polyurethane composition. The thermoplastic polyurethane composition includes thermoplastic polyurethane, a polysiloxane, an acetal polymer, and an acrylonitrile-butadiene-styrene (ABS) copolymer. The method of forming the TPU composition includes the step of combining the thermoplastic polyurethane, the polysiloxane, the acetal polymer, and the ABS copolymer. The present invention also provides an article including the thermoplastic polyurethane composition.

The thermoplastic polyurethane composition of this invention has a decreased coefficient of friction and an increased abrasion resistance, as compared to thermoplastic polyurethane compositions that include only thermoplastic polyurethanes or other combinations of thermoplastic polyurethanes with other polymers. Further, the thermoplastic polyurethane composition can be processed to form articles with a range of finishes from matte to glossy. The thermoplastic polyurethane composition also exhibits excellent mechanical properties such as tensile strength, modulus, elongation at break, and tear strength. These physical properties allow the thermoplastic polyurethane composition to be used to form articles such as hose and cable jackets, golf ball and disc covers, conveyor belts, and caster tires.

It is believed that the thermoplastic polyurethane itself contributes to the increased abrasion resistance of the thermoplastic polyurethane composition of the instant invention. It is also believed that the ABS copolymer contributes to a decreased coefficient of friction and reduces a tackiness of the thermoplastic polyurethane composition. Further, it is believed that the ABS copolymer contributes to ease of processability of the thermoplastic polyurethane composition and increases a processing window in extrusion and injection molding applications. Still further, it is believed that the polysiloxane and the acetal polymer at least partially coat a surface of the thermoplastic polyurethane and allow the thermoplastic polyurethane composition to maintain the increased abrasion resistance and the decreased coefficient of friction while simultaneously allowing the thermoplastic polyurethane composition to be formed into articles having surface finishes ranging from matte to glossy.

DETAILED DESCRIPTION OF THE INVENTION

The instant invention provides a thermoplastic polyurethane composition, a method of forming the thermoplastic polyurethane composition, and an article including the thermoplastic polyurethane composition. The thermoplastic polyurethane composition, hereinafter referred to as "TPU composition," includes thermoplastic polyurethane (TPU), a polysiloxane, an acetal polymer, and an acrylonitrile-butadiene-styrene (ABS) copolymer. In one embodiment, the TPU composition consists essentially of the TPU, the polysiloxane, the acetal polymer, and the ABS copolymer. In another embodiment, the TPU composition consists of the TPU, the polysiloxane, the acetal polymer, and the ABS copolymer. The TPU composition is preferably elastomeric, i.e., the TPU composition is preferably free from cells characteristic of foams, and is preferably formed in the absence of cell formation through action of blowing agents.

It is believed that the TPU provides excellent abrasion resistance to the TPU composition. The TPU is preferably selected from the group of polyester-based TPUs, polyether-based TPUs, and combinations thereof. However, it is to be understood that the TPU may be any TPU known in the art. For purposes of the instant application, a "polyester-based" TPU is a TPU that includes at least two ester groups present therein and/or is formed from a reactant that includes a polyester bond. Likewise, also for purposes of the instant application, a "polyether-based" TPU is a TPU that includes at least two ether groups present therein and/or is formed from a reactant that includes a polyether bond. It is to be appreciated that for both polyester-based and polyether-based TPUs, reactants can be used to form the TPUs that do not include polyester or polyether groups therein. Further, it is also to be appreciated that suitable TPUs for purposes of the instant invention are not limited to polyester-based or polyether-based TPUs, and that other TPUs may also be suitable that do not include ether or ester groups present therein.

The TPU preferably comprises the reaction product of a polyol and an isocyanate. In one embodiment, the TPU is the polyester-based TPU and includes the reaction product of a polyester polyol and an isocyanate component. Suitable polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Glycols that are suitable for use in producing the polyester polyols may be selected from the group of, but are not limited to, ethylene glycol, butylene glycol, hexanediol, bis(hydroxymethylcyclohexane), 1,4-butanediol, diethylene glycol, 2,2-dimethyl propylene glycol, 1,3-propylene glycol, and combinations thereof. Specific examples of suitable polyester-based TPUs that may be used in this invention include, but are not limited to, Elastollan® 600, 800, B, C, and S Series polyester-based TPUs commercially available from BASF Corporation.

In a further embodiment, the TPU is a polyether-based TPU and includes the reaction product of a polyether polyol and an isocyanate component. Suitable polyether polyols may be selected from the group of, but are not limited to, polytetramethylene glycol, polyethylene glycol, polypropylene glycol, and combinations thereof. Specific examples of suitable polyether-based TPUs that may be used in this invention include, but are not limited to, Elastollan® 1100 and 1200 Series polyether-based TPUs commercially available from BASF Corporation.

In an alternative embodiment, the TPU further includes the reaction product of a chain extender, in addition to the polyester polyols or polyether polyols in the polyester-based or polyether-based TPUs, respectfully. In yet another alternative embodiment, the TPU may comprise the reaction product of the chain extender and the isocyanate in the absence of polyester polyols and/or polyether polyols. Suitable chain extenders may be selected from the group of, but are not limited to, diols including ethylene glycol, propylene glycol, butylene glycol, 1,4-butanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, and thiodiglycol; diamines including ethylene diamine, propylene diamine, butylene diamine, hexamethylene diamine, cyclohexylene diamine, phenylene diamine, tolylene diamine, xylylene diamine, 3,3'-dichlorobenzidine, and 3,3'-dinitrobenzidine; alkanol amines including ethanol amine, aminopropyl alcohol, 2,2-dimethyl propanol amine, 3-aminocyclohexyl alcohol, and p-aminobenzyl alcohol; and combinations of any of the aforementioned chain extenders.

Typically, the polyol used to form the TPU has a weight average molecular weight of from 600 to 2,500 g/mol. It is to be appreciated that when multiple polyols are used to form the TPUs, each of the polyols preferably has a weight average molecular weight within the above range. However, the polyol used to form the TPU is not limited to this molecular weight range. Without intending to be limited by any particular theory, it is believed that decreasing the weight average molecular weight of the polyols increases a flowability and transparency of the TPU. Similarly, it is believed that increasing the weight average molecular weight of the polyols increases a low temperature flexibility of the TPU.

The isocyanate component that is used to form the TPU may include, but is not limited to, monoisocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate. In this embodiment, n is a number preferably from 2 to 5, more preferably from 2 to 4, and most preferably from 2 to 3. It is to be understood that n may be an integer or may have intermediate values from 2 to 5. The isocyanate component may include an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylene polyoxyethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula R'(NCO)$_z$ wherein R' is aromatic and z is an integer that corresponds to the valence of R'. Preferably, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

In one embodiment, the isocyanate component has a maximum 85.7 wt % of NCO content. The isocyanate component may also react with the polyol and/or chain extender in any amount, as determined by one skilled in the art. Preferably, the isocyanate component and the polyol and/or chain extender are reacted at an isocyanate index of from 90 to 115, more preferably from 95 to 105, and alternatively from 105 to 110.

It is contemplated that the TPU composition may include one or more TPUs. When more than one TPU is included in the TPU composition, at least one TPU meets the description of the TPUs set forth above, and the additional TPUs are not limited to any particular TPU but preferably include a polyether-based TPU and/or a polyester-based TPU.

The TPU is preferably present in the TPU composition in an amount of 60 to 90, more preferably from 70 to 80, and most preferably from 74 to 78, parts by weight per 100 parts by weight of the TPU composition. When the TPU composition includes more than one TPU, the total amount of TPU present in the TPU composition is within the above ranges. In one embodiment, a single polyether-based TPU is present in an amount of approximately 76.8 parts by weight per 100 parts by weight of the TPU composition.

In addition to the TPU, the TPU composition also includes the polysiloxane first introduced above. Without being bound to any particular theory, it is believed that the polysiloxane (in conjunction with the acetal polymer) at least partially coats a surface of the thermoplastic polyurethane and allows the thermoplastic polyurethane composition to maintain the increased abrasion resistance and while also decreasing coefficient of friction. As is known in the art, polysiloxanes typically include a polymerization product of one or more siloxane monomers that include $R_2SiO$ units wherein each R is a hydrogen atom or a hydrocarbon group. Siloxane monomers may also have branched or unbranched backbones of alternating silicon and oxygen atoms (—Si—O—Si—O—) with side chains attached to the silicon atoms.

The polysiloxane of the instant invention may be any known in the art. Typically, the polysiloxane has one of the following structures:

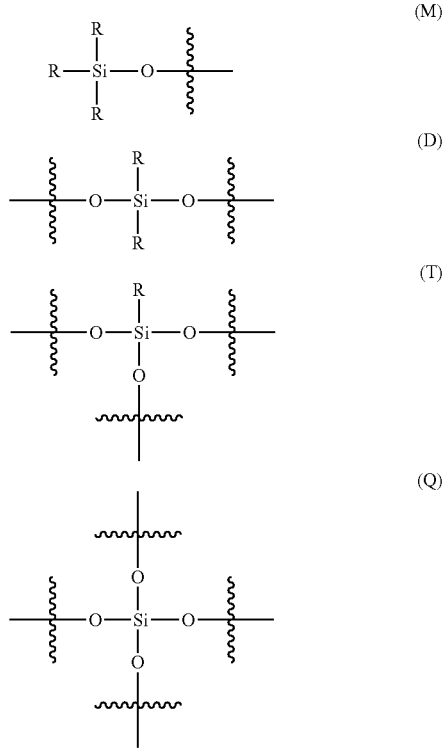

wherein each of M, D, T, and Q independently represent functionality of structural groups of polysiloxanes. Specifically, M represents a monofunctional group $R_3SiO_{1/2}$. D represents a difunctional group $R_2SiO_{2/2}$. T represents a trifunctional group $RSiO_{3/2}$ Q represents a tetrafunctional group $SiO_{4/2}$. Examples of suitable polysiloxanes include MQ resins having $R_3SiO_{1/2}$ groups and $SiO_{4/2}$ groups, DT resins having $RSiO_{3/2}$ groups and $R_2SiO_{2/2}$ groups, MT resins having $R_3SiO_{1/2}$ groups and $RSiO_{3/2}$ groups, MDT resins having $R_3SiO_{1/2}$ groups, $RSiO_{3/2}$ groups, and $R_2SiO_{2/2}$ groups, and combinations thereof. In each of these resins, R may be selected from the group of aliphatic, cylcoaliphatic, and aromatic moeities.

It is also contemplated that the polysiloxane may be selected from the group of polydimethylsiloxane, α,ω-methacryloxymethyldimethylsilyl terminated polydimethylsiloxane, methacryloxypropyl-terminated polydimethylsiloxane, α,ω-acryloxymethyldimethylsilyl terminated polydimethylsiloxane, methacryloxypropyldimethylsilyl terminated polydimethylsiloxane, α,ω-acryloxypropyldimethylsilyl terminated polydimethylsiloxane, poly(acryloxypropyl-methylsiloxy), polydimethylsiloxane and poly(methacryloxypropyl-methylsiloxy) polydimethylsiloxane copolymers, telechelic polydimethylsiloxanes having multiple acrylate or methacrylate functional groups, and combinations thereof. Typically, the polysiloxane has a weight average molecular weight of greater than 236, more typically at least 500,000, and most typically about 1,000,000, g/mol. In one embodiment, the polysiloxane is an ultra-high molecular weight polydimethylsiloxane having a weight average molecular weight of about 1,000,000 g/mol and is commercially available from Dow Corning of Midland, Mich. In various embodiments, the polysiloxane is preferably present in the TPU composition in an amount of from 1 to 10, more preferably from 1 to 5, and most preferably from 1 to 3, parts by weight per 100 parts by weight of the TPU composition. Of course, it is to be understood that the polysiloxane is not limited to these amounts and may be present in the TPU composition in any amount, as determined by one of skill in the art depending on desired properties of the TPU composition. It is contemplated that the TPU composition may also include a second or additional polysiloxane that is different from the polysiloxane described above. The polysiloxane, or polysiloxanes, may also be combined with the acetal polymer, described immediately below, for purposes of the method of forming the TPU composition in accordance with the instant invention.

In addition to the polysiloxane, the TPU composition also includes the acetal polymer. As described above, and without being bound to any particular theory, it is believed that the acetal polymer, in conjunction with the polysiloxane, provides the TPU composition with a decreased coefficient of friction while allowing abrasion resistance of the TPU composition to be maintained. The acetal polymer may be further defined as a homopolymer, a copolymer, or a mixture of homopolymers and copolymers. In one embodiment, the acetal polymer is further defined as a polyoxymethylene polymer. For example, the polyoxymethylene polymer may be further defined as a polyoxymethylene homopolymer (—(—O—CH$_2$—)$_n$—) wherein n may be any number greater than 1. As is known in the art, homopolymers of polyoxymethylene are typically synthesized by polymerizing anhydrous formaldehyde by anionic catalysis and then stabilized by reaction with acetic anhydride. As another example, the polyoxymethylene polymer may be a polyoxymethylene copolymer. As is also known in the art, copolymers of polyoxymethylene may be synthesized by converting formaldehyde to trioxane via acid catalysis and then reacting the trioxane with dioxolane or ethylene oxide to form the copolymer using acid catalysts. Examples of suitable polyoxymethylene polymers that may be used in this invention are commercially available from Dow Corning Corporation of Midland, Mich. and are alternatively available from BASF Corporation under the trade name Ultraform®.

The acetal polymer is preferably present in the TPU composition in an amount of from 1 to 10, more preferably from 1 to 5, and most preferably from 1 to 3, parts by weight per 100 parts by weight of the TPU composition. Of course, it is to be understood that the acetal polymer is not limited to these amounts and may be present in the TPU composition in any amount, as determined by one of skill in the art depending on desired properties of the TPU composition. Further, it is to be appreciated that more than one acetal polymer may be included in the TPU composition, in which case the total amount of all acetal polymers present in the TPU composition is within the above ranges. In one embodiment, the acetal polymer is combined with the polysiloxane to form a mixture. In this embodiment, the acetal polymer is preferably present in the mixture in an amount of from 20 to 80, more preferably from 30 to 70, even more preferably from 30 to 50, and most preferably about 40, parts by weight per 100 parts by weight of the mixture. Similarly, in this embodiment, the polysiloxane is also preferably present in the mixture in an amount of from 20 to 80, more preferably from 30 to 70, even more preferably from 30 to 50, and most preferably about 40, parts by weight per 100 parts by weight of the mixture. The mixture described above includes the acetal polymer and the polysiloxane but may consist essentially of, or consist of, the acetal polymer and the polysiloxane. Non-limiting examples of suitable polyoxymethylene copolymers and polysiloxane mixtures that may be used in this invention are commercially available from Dow Corning Corporation of Midland, Mich. under the trade names of MB5040-006, MB50-001, MB50-002, MB50-004, MB50-008, MB50-0110, MB50-011, MB25-302, MB50-313, MB50-314, MB25-501, MB25-504, and MB25-513.

In addition to the TPU, the polysiloxane, and the acetal polymer, the TPU composition also includes the acrylonitrile-butadiene-styrene (ABS) copolymer. Without being bound to any particular theory, it is also believed that the ABS copolymer contributes to a decreased coefficient of friction and reduces a tackiness of the thermoplastic polyurethane composition. The ABS copolymer is typically a graft copolymer; however, it is to be appreciated that the instant invention is not limited to the ABS copolymer being a graft copolymer. In one embodiment, the TPU composition includes more than one ABS copolymer, in which the various ABS copolymers may be different from each other. In one embodiment, the ABS copolymer is a copolymer of (1) methyl methacrylate (MMA) or copolymer thereof, (2) a styrene-acrylonitrile copolymer, (3) a styrene butadiene rubber grafted with MMA, and optionally (4) styrene. In this embodiment, the (1) MMA may be a homopolymer of MMA. Alternatively, the (1) MMA copolymer may be a copolymer of MMA and an alkyl acrylate having from 1 to 8 carbon atoms in an alkyl radical. The alkyl acrylate may be present in the (1) MMA copolymer in an amount of from 0.5 to 10, more preferably about 7, parts by weight per 100 parts by weight of the (1) MMA copolymer. Examples of suitable alkyl acrylates include, but are not limited to, ethyl acrylate, propyl acrylate, butyl acrylate, and combinations thereof. Preferably, the (1) MMA or copolymer thereof has a weight average molecular weight of from 60,000 to 300,000 g/mol, as measured by light scattering in chloroform.

The (2) styrene-acrylonitrile copolymer described above may be a copolymer including styrene in an amount of from 70 to 90, and more preferably from 78 to 88, parts by weight and acrylonitrile in an amount of from 10 to 30, and more preferably from 12 to 22, parts by weight per 100 parts by weight of the styrene-acrylonitrile copolymer. Preferably, the styrene-acrylonitrile copolymer has a weight average molecular weight of from 60,000 to 300,000 g/mol, as determined by light scattering in dimethylformamide.

The (3) styrene butadiene rubber grafted with MMA typically has a glass transition temperature of up to about −20° C. and may include butadiene rubber in an amount of from 50 to 80 parts by weight per 100 parts by weight of the styrene butadiene rubber grafted with MMA, with a balance being styrene and MMA. The butadiene rubber may also include the reaction product of from 60 to 90 parts by weight of butadiene, isoprene, and combinations thereof, per 100 parts by weight of the styrene butadiene rubber grafted with MMA, with a balance being styrene or alkyl styrene monomers.

Preferably, the (1) MMA or copolymer thereof is present in the ABS copolymer in an amount of from 15 to 70, more preferably from 30 to 60, parts by weight per 100 parts by weight of the ABS copolymer. The (2) styrene-acrylonitrile copolymer is preferably present in the ABS copolymer in an amount of from 10 to 50, more preferably from 10 to 40, parts by weight per 100 parts by weight of the ABS copolymer. The (3) styrene-butadiene rubber grafted with MMA is preferably present in the ABS polymer in an amount of from 20 to 50, more preferably from 25 to 40, parts by weight per 100 parts by weight of the ABS copolymer. Non-limiting examples of suitable ABS copolymers include Terlux® 2802 TR and Terlux® 2812 TR, both of which are commercially available from BASF Corporation.

The ABS copolymer is typically present in the TPU composition in an amount of from 1 to 50, more typically from 5 to 40 parts by weight, even more typically from 15 to 25, and most typically from 19 to 20, parts by weight per 100 parts by weight of the TPU composition. In one embodiment, the ABS copolymer is present in an amount of approximately 19.2 parts by weight per 100 parts by weight of the TPU composition.

In addition to the TPU, the polysiloxane, the acetal polymer, and the ABS copolymer, the TPU composition may also include one or more additives selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, transition metals, catalysts, blowing agents, surfactants, cross-linkers, inert diluents, and combinations thereof. Some particularly suitable additives include, but are not limited to, carbodiimides to reduce hydrolysis, hindered phenols and hindered amine light stabilizers to reduce oxidation and yellowing, benzotriazoles to increase UV light stabilization, glass fillers, and salts of sulfonic acid to increase antistatic properties of the TPU composition. The additive(s) may be included in any amount as desired by those of skill in the art.

The TPU composition including the TPU, the polysiloxane, the acetal polymer, and the ABS copolymer preferably has a density of from 1 to 3, more preferably from 1.1 to 1.3, and most preferably from 1.1 to 1.2, g/cm$^3$ as determined by DIN EN ISO 1183-1-A. In one embodiment, the TPU composition has a density of about 1.1 g/cm$^3$. The TPU composition also preferably has a Shore "A" hardness of from 55 to 96, more preferably from 65 to 96, and most preferably from 90 to 96, pts as determined by DIN 53505. In another embodiment, the TPU composition has a Shore "A" hardness of about 94 pts. Further, the TPU composition preferably has a Shore "D" hardness of from 36 to 75, more preferably from 40 to 75, and most preferably from 50 to 75, pts as determined by DIN 53505. In yet another embodiment, the TPU composition has a Shore "D" hardness of about 44 pts. Still further, the TPU composition preferably has a DIN abrasion loss of from 2 to 11, more preferably from 2 to 10, and most preferably from 2 to 4, mm$^3$ as determined by DIN 53516. In still another embodiment, the TPU composition has a DIN abrasion of about 10.1 mm$^3$. The TPU composition also preferably has a tensile strength of from 10 to 55, more preferably from 15 to 55, and most preferably from 20 to 55, MPa as determined by DIN 53504. In an additional embodiment, the TPU composition has a tensile strength of about 20 MPa. The TPU composition may also have a stress at 300% elongation of from 4 to 45, more preferably from 10 to 45, most preferably from 15 to 45, MPa as determined by DIN 53504. In one embodiment, the TPU composition has a stress at 300% elongation of about 16.3 MPa. In addition, the TPU composition preferably has a stress at 100% elongation of from 2 to 30, more preferably from 5 to 30, and most preferably from 10 to 30, MPa as determined by DIN 53504. In another embodiment, the TPU composition has a stress at 100% elongation of about 13.4 MPa. Further, the TPU composition preferably has a stress at 50% elongation of from 4 to 15, more preferably from 4.5 to 11, MPa as determined by DIN 53504. In an additional embodiment, the TPU composition has a stress at 50% elongation of about 10.9 MPa. Still further, the TPU composition preferably has an elongation at break of from 300 to 900, more preferably from 400 to 900, and most preferably from 500 to 900, percent as determined by DIN 53504. In a further embodiment, the TPU composition has an elongation at break of about 505 percent. The TPU composition may have an elasticity modulus of from 10 to 730, more preferably from 50 to 730, MPa as determined by DIN EN ISO 527. In still a further embodiment, the TPU composition has an elasticity modulus of about 52.2 MPa. The TPU composition also preferably has a Die C tear strength of from 100 to 700, more preferably from 200 to 700, and most preferably from 500 to 700, lb$_f$/in. as determined by ASTM D-624 Die C. In one embodiment, the TPU composition has a Die C tear strength of approximately 551 lb$_f$/in. The TPU composition also preferably has a coefficient of friction of less than or equal to 2, more preferably less than 1.5, even more preferably less than 1, still more preferably less than 0.5, and most preferably less than 0.3 as determined by ASTM D1894. In one embodiment, the TPU composition has a coefficient of friction of approximately 0.5. Still further, the TPU composition can be used to form an article have any finish ranging from a matte finish to a glossy finish, as determined by visual inspection and as described in further detail below.

In addition to the TPU composition, the instant invention also provides the method of forming the TPU composition, as first introduced above. The method includes the step of combining the TPU, the polysiloxane, and acetal polymer, and the ABS copolymer to form the TPU composition. In one embodiment, the step of combining is further defined as combining the polysiloxane and the acetal polymer to form a first mixture, and then combining the first mixture with the TPU and the ABS copolymer. It is contemplated that one or more of the TPU, the polysiloxane, the acetal polymer, and the ABS copolymer may be individually combined together prior to combination of each of the TPU, the polysiloxane, the acetal polymer, and the ABS copolymer together. The step of combining may occur through any method known in the art including, but not limited to, direct extrusion, belt extrusion, reaction extrusion, reaction injection molding, vertical mixing, horizontal mixing, feed mixing, and combinations thereof.

In one embodiment, the step of combining is further defined as feeding the TPU, the ABS copolymer, and the first mixture of the polysiloxane and the acetal polymer, into a compounding device such as a twin screw extruder. The TPU and the ABS copolymer may also be mixed together prior to feeding into the compounding device. In one embodiment of this method, a single-screw extruder with an auxiliary mixing mechanism is utilized.

The method may also include the step of heating the TPU, the ABS copolymer, the polysiloxane, and/or the acetal polymer while in the compounding device, outside of the compounding device, or both outside of the compounding device and in the compounding device. It is to be appreciated that the TPU, the ABS copolymer, the polysiloxane, and/or the acetal polymer may be heated even if no compounding device is used. The TPU, the ABS copolymer, the polysiloxane, and the acetal polymer are preferably heated to a temperature of from 250 to 450, more preferably from 350 to 400, ° F. It is believed that the heating promotes compounding of the TPU, the ABS copolymer, the polysiloxane, and the acetal polymer. It is also contemplated that the method may include the step of tempering the TPU composition.

In one embodiment, after formation of the TPU composition in the compounding device, the TPU composition is extruded in a twin-screw extruder and pelletized, diced, or granulated upon discharge. In another embodiment, the TPU, the ABS copolymer, and the first mixture of the polysiloxane and the acetal polymer are fed into a twin screw extruder and the TPU composition is extruded at a temperature of less than or equal to about 370° F. to form an article. When the TPU composition is extruded at this temperature and used to form the article, the finished article typically has a matte finish, as visually observed. In an alternative embodiment, the TPU, the ABS copolymer, and the first mixture of the polysiloxane and the acetal polymer are fed into a twin screw extruder and the TPU composition is extruded at a temperature of greater than or equal to about 400° F. to form an article. When the TPU composition is extruded at this temperature and used to form the article, the finished article typically has a glossy finish, as visually observed. The TPU composition may also be extruded to form a sleeve or a sheet as the article. The sheet may be rolled or laid on top of another layer of material, such as fabric, to produce an article.

As described above, the instant invention also provides the article including the TPU composition. The article may be any known in the art including, but not limited to, hose jacketing, wire and cable jacketing, wheels and caster tires, conveyor belts, mechanical goods, sporting goods, appliances and furniture, animal tags, golf ball, and disc covers. In one embodiment, the article is multi-layered and includes a layer of fabric and a layer of the TPU composition, as described above. In another embodiment, the article includes a single layer.

EXAMPLES

A TPU composition (TPU Composition 1) is formed according to the instant invention by adding amounts of thermoplastic polyurethane (TPU), a polysiloxane, an acetal polymer, and an acrylonitrile-butadiene-styrene (ABS) copolymer to a vessel to form a mixture. The mixture is then injection molded using a process well known in the art and under conditions set forth in Table 1 to form a plaque of TPU Composition 1.

Three Comparative Compositions (Comparative Compositions 1-3) are also formed but not according to the instant invention. To form a plaque of the Comparative Composition 1, an amount of the TPU and the ABS copolymer are injection molded under conditions set forth in Table 1. To form a plaque of the Comparative Composition 2, an amount of TPU is injection molded under conditions set forth in Table 1. Additionally, to form a plaque of the Comparative Composition 3, an amount of the TPU, the polysiloxane, and the acetal polymer are injection molded under conditions set forth in Table 1. Each of the plaques is approximately 5"×4"×0.08" and is formed using an extruder having a 1.5" diameter screw with L/D ratio of 24:1. Additionally, the amounts of each of the TPU, the polysiloxane, the acetal polymer, and the ABS copolymer used to form each of the plaques of the TPU Composition 1 and Comparative Compositions 1-3 are set forth in Table 2 below.

TABLE 1

| Molding Conditions | TPU Composition 1 | Comparative Composition 1 | Comparative Composition 2 | Comparative Composition 3 |
|---|---|---|---|---|
| Zone 1 Temperature (° F.) | 410 | 410 | 410 | 410 |
| Zone 2 Temperature (° F.) | 400 | 400 | 400 | 400 |
| Zone 3 Temperature (° F.) | 390 | 390 | 380 | 380 |
| Nozzle temperature (° F.) | 420 | 420 | 420 | 420 |
| Sprue Temperature (° F.) | 415 | 415 | 400 | 400 |
| Mold Temperature (° F.) | 80 | 80 | 80 | 80 |
| Pack Time (sec) | 8 | 8 | 8 | 8 |
| Hold Time (sec) | 6 | 6 | 8 | 8 |
| Cool Time (sec) | 10 | 10 | 10 | 10 |
| Packing Pressure (psi) | 800 | 800 | 800 | 800 |
| Holding Pressure (psi) | 700 | 700 | 700 | 700 |
| Back Pressure (psi) | 200 | 200 | 200 | 200 |
| Speed (inch/sec) | 1 | 1 | 1 | 1 |
| Transfer Pressure (psi) | 1090 | 1030 | 1320 | 1150 |
| Screw RPM | 30 | 30 | 30 | 30 |

TABLE 2

| | TPU Composition 1 | Comparative Composition 1 | Comparative Composition 2 | Comparative Composition 3 |
|---|---|---|---|---|
| TPU | 76.8 | 80 | 100 | 4 |
| Polysiloxane/Acetal Polymer Mixture | 4 | — | — | 96 |
| ABS Copolymer | 19.2 | 20 | — | — |

The TPU is a polyether-based aromatic TPU commercially available from BASF Corporation under the trade name of Elastollan® 1190 A 10.

The Polysiloxane/Acetal Polymer Mixture is 50:50 weight percent mixture of an ultra-high molecular weight siloxane polymer and a polyoxymethylene copolymer that is commercially available from Dow Corning Corporation of Midland, Mich. under the trade name of Dow Corning MB40-006 Masterbatch.

The ABS Copolymer is a graft copolymer of methylmethacrylate and acrylonitrile-butadiene-styrene that is commercially available from BASF Corporation under the trade name of Terlux® 2802 HD.

After formation of the plaques of TPU Composition 1 and the Comparative Compositions 1-3, each plaque is analyzed to determine Density, Shore "A" Hardness, DIN Abrasion Loss, Stress at 300% Elongation, Stress at 100% Elongation, Stress at 50% Elongation, Elongation at Break, Elasticity Modulus, Die C Tear Strength, Coefficient of Friction, and Surface Finish in accordance with the testing methods set forth above. The results of each of these analyses are set forth in Table 3 below.

TABLE 3

| | Plaque of TPU Composition 1 | Plaque of Comparative Composition 1 | Plaque of Comparative Composition 2 | Plaque of Comparative Composition 3 |
|---|---|---|---|---|
| Density (g/cm$^3$) | 1.1 | 1.12 | 1.14 | 1.12 |
| Shore A Hardness (pts) | 94 | 90 | 89 | 90 |
| Tensile Strength (MPa) | 20.0 | 19.5 | 33.5 | 32.5 |
| Stress at 300% Elongation (MPa) | 16.3 | 16.1 | 18.4 | 19.3 |
| Stress at 100% Elongation (MPa) | 13.4 | 13.4 | 9.6 | 10.1 |
| Stress at 50% Elongation (MPa) | 10.9 | 10.8 | 7.2 | 7.7 |
| Elongation at Break (%) | 505 | 529 | 464 | 458 |
| Elasticity Modulus (MPa) | 52.2 | 49.4 | 26.9 | 32.63 |
| Die C Tear Strength (lb$_f$/in) | 551 | 562 | 674 | 667 |
| Coefficient of | <0.5 | ~0.5 | >2 | >2 |

TABLE 3-continued

| | Plaque of TPU Composition 1 | Plaque of Comparative Composition 1 | Plaque of Comparative Composition 2 | Plaque of Comparative Composition 3 |
|---|---|---|---|---|
| Friction DIN Abrasion Loss (mm$^3$) | 10.1 | 28.3 | 11.7 | 9 |
| Surface Finish | Matte or Glossy | Matte Only | Matte or Glossy | Matte or Glossy |

As the results in Table 3 demonstrate, TPU Composition 1 of the instant invention exhibits both a low Coefficient of Friction, as compared to the Comparative Compositions 1-3, and a high Abrasion Resistance, as compared to the Comparative Compositions 1 and 2. This allows TPU Composition 1 to be effectively used in a variety of applications such as in hose and cable jacketing with minimized tackiness and increased ease of use. This also allows TPU Composition 1 to be used to form products that resist abrasion, marring, and scuffing, such as golf ball covers. TPU Composition 1 can also be formed with a matte or glossy finish and still retain excellent physical and surface properties thereby further expanding the potential uses of the TPU composition of the instant invention. Still further, it is believed that use of TPU Composition 1 will result in reduced die buildup, i.e., a reduced deposition of crystalline TPU on a die, as compared to use of Comparative Compositions 2 and 3. Further, it is believed that use of TPU Composition 1 will result in a larger processing temperature window as compared to use of Comparative Compositions 1-3. This will likely reduce scrap amounts of the TPU composition, reduce production costs, and increase production efficiency and capacity.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A thermoplastic polyurethane composition comprising:
   thermoplastic polyurethane;
   a polysiloxane having a weight average molecular weight of at least 500,000 g/mol;
   an acetal polymer; and
   an acrylonitrile-butadiene-styrene copolymer.

2. The thermoplastic polyurethane composition as set forth in claim 1, wherein said thermoplastic polyurethane is at least one selected from the group consisting of polyether-based thermoplastic polyurethanes and polyester-based thermoplastic polyurethanes.

3. The thermoplastic polyurethane composition of claim 1, wherein said thermoplastic polyurethane comprises a reaction product of a polyol and an isocyanate.

4. The thermoplastic polyurethane composition of claim 3, wherein the polyol has a weight average molecular weight of from 600 to 2,500 g/mol.

5. The thermoplastic polyurethane composition of claim 1, wherein the thermoplastic polyurethane is present in a total amount of from 60 to 90 parts by weight per 100 parts by weight of the thermoplastic polyurethane composition.

6. The thermoplastic polyurethane composition of claim 1, wherein said acetal polymer is a polyoxymethylene polymer.

7. A thermoplastic polyurethane composition comprising:
   thermoplastic polyurethane;
   a polysiloxane,
   an acetal polymer; and
   an acrylonitrile-butadiene-styrene copolymer, wherein said acrylonitrile-butadiene-styrene copolymer is present in an amount of from 15 to 25 parts by weight per 100 parts by weight of said thermoplastic polyurethane composition.

8. A thermoplastic polyurethane composition comprising:
   thermoplastic polyurethane;
   a polysiloxane;
   an acetal polymer; and
   an acrylonitrile-butadiene-styrene copolymer, having a coefficient of friction of less than or equal to 2 as determined by ASTM D1894.

9. A thermoplastic polyurethane composition comprising:
   thermoplastic polyurethane;
   a polysiloxane;
   an acetal polymer; and
   an acrylonitrile-butadiene-styrene copolymer, having a DIN abrasion loss of from 2 to 11 mm$^3$ as determined by DIN 53516.

10. An article comprising the thermoplastic polyurethane composition of claim 1.

11. A method of forming an article, the method comprising extruding the thermoplastic polyurethane composition of claim 1 at a temperature of greater than or equal to 400° F.

12. A method of forming a thermoplastic polyurethane composition of claim 1, said method comprising combining:
    thermoplastic polyurethane;
    a polysiloxane;
    an acetal polymer; and
    an acrylonitrile-butadiene-styrene copolymer.

13. The method of claim 11 wherein combining is a combining the polysiloxane and the acetal polymer to form a first mixture, and then combining the first mixture with the thermoplastic polyurethane and the acrylonitrile-butadiene-styrene copolymer.

14. The thermoplastic polyurethane composition of claim 2, wherein said thermoplastic polyurethane comprises a reaction product of a polyol and an isocyanate.

15. The thermoplastic polyurethane composition of claim 14, wherein the polyol has a weight average molecular weight of from 600 to 2,500 g/mol.

16. The thermoplastic polyurethane composition of claim 2, wherein the thermoplastic polyurethane is present in a total amount of from 60 to 90 parts by weight per 100 parts by weight of the thermoplastic polyurethane composition.

17. The thermoplastic polyurethane composition of claim 3, wherein the thermoplastic polyurethane is present in a total amount of from 60 to 90 parts by weight per 100 parts by weight of the thermoplastic polyurethane composition.

18. The thermoplastic polyurethane composition of claim 14, wherein the thermoplastic polyurethane is present in a total amount of from 60 to 90 parts by weight per 100 parts by weight of the thermoplastic polyurethane composition.

* * * * *